United States Patent [19]

Ogawa

[11] Patent Number: 5,600,557

[45] Date of Patent: Feb. 4, 1997

[54] TRANSMISSION CONTROL APPARATUS FOR NONSTAGE TRANSMISSION OF VEHICLES

[75] Inventor: Sumitaka Ogawa, Saitama, Japan

[73] Assignee: Honda Giken Kogyo Kabushiki Kaisha, Tokyo, Japan

[21] Appl. No.: 282,560

[22] Filed: Jul. 29, 1994

[30] Foreign Application Priority Data

Aug. 9, 1993 [JP] Japan .................................. 5-197521

[51] Int. Cl.$^6$ .......................... B60K 26/00; F16H 61/02
[52] U.S. Cl. .................... 364/428.086; 477/37; 477/115; 395/900; 395/905
[58] Field of Search ........................ 364/424.1; 395/900, 395/905, 913; 477/37, 44, 115, 120

[56] References Cited

U.S. PATENT DOCUMENTS

| | | | |
|---|---|---|---|
| 5,021,958 | 6/1991 | Tokoro | 364/424.1 X |
| 5,036,730 | 8/1991 | Sakai et al. | 364/424.1 X |
| 5,067,374 | 11/1991 | Sakai et al. | 364/424.1 X |
| 5,079,704 | 1/1992 | Sakai et al. | 364/424.1 |
| 5,124,916 | 6/1992 | Tokoro et al. | 364/424.1 |
| 5,163,530 | 11/1992 | Nakamura et al. | 180/197 |
| 5,267,158 | 11/1993 | Sakaguchi et al. | 364/424.1 |
| 5,303,153 | 4/1994 | Sakai et al. | 364/424.1 |
| 5,323,318 | 6/1994 | Hasegawa et al. | 364/424.1 |
| 5,389,050 | 2/1995 | Sakai et al. | 364/424.1 X |

FOREIGN PATENT DOCUMENTS 2135626 11/1993 Canada .
0531154 9/1993 European Pat. Off. .
59-144850 8/1984 Japan .
WO93/23689 11/1993 WIPO .

*Primary Examiner*—Kevin J. Teska
*Assistant Examiner*—Tan Nguyen

[57] ABSTRACT

To provide the driver with a driving feeling which faithfully keeps up with various running states of the vehicle and running requirements of the driver by finding an accommodation coefficient indicating a running state by fuzzy inference. A target rotational speed of the engine is set on the basis of the accommodation coefficient found during the previous step. The change-gear ratio of the nonstage transmission is controlled so as to result in the target rotational speed of the engine set at the immediately previous step. A transmission control unit includes an accommodation coefficient fuzzy-inferring control, a target engine rotational speed setting control and a change-gear ratio controlling member. Inputting the change-gear ratio R, the throttle opening O, the speed v of the vehicle and the change in vehicle speed per unit time (or the acceleration) G, the accommodation coefficient fuzzy-inferring control finds a rate of change A in accommodation coefficient A by using fuzzy rules set in advance. The target engine rotational speed setting control sets a target rotational speed NE of an engine on the basis of at least the accommodation coefficient A and the speed V of the vehicle. The change-gear ratio controlling member controls the change-gear ratio R of the non-state transmission to provide a rotational speed N of the engine equal to the target engine rotational speed NE.

24 Claims, 15 Drawing Sheets

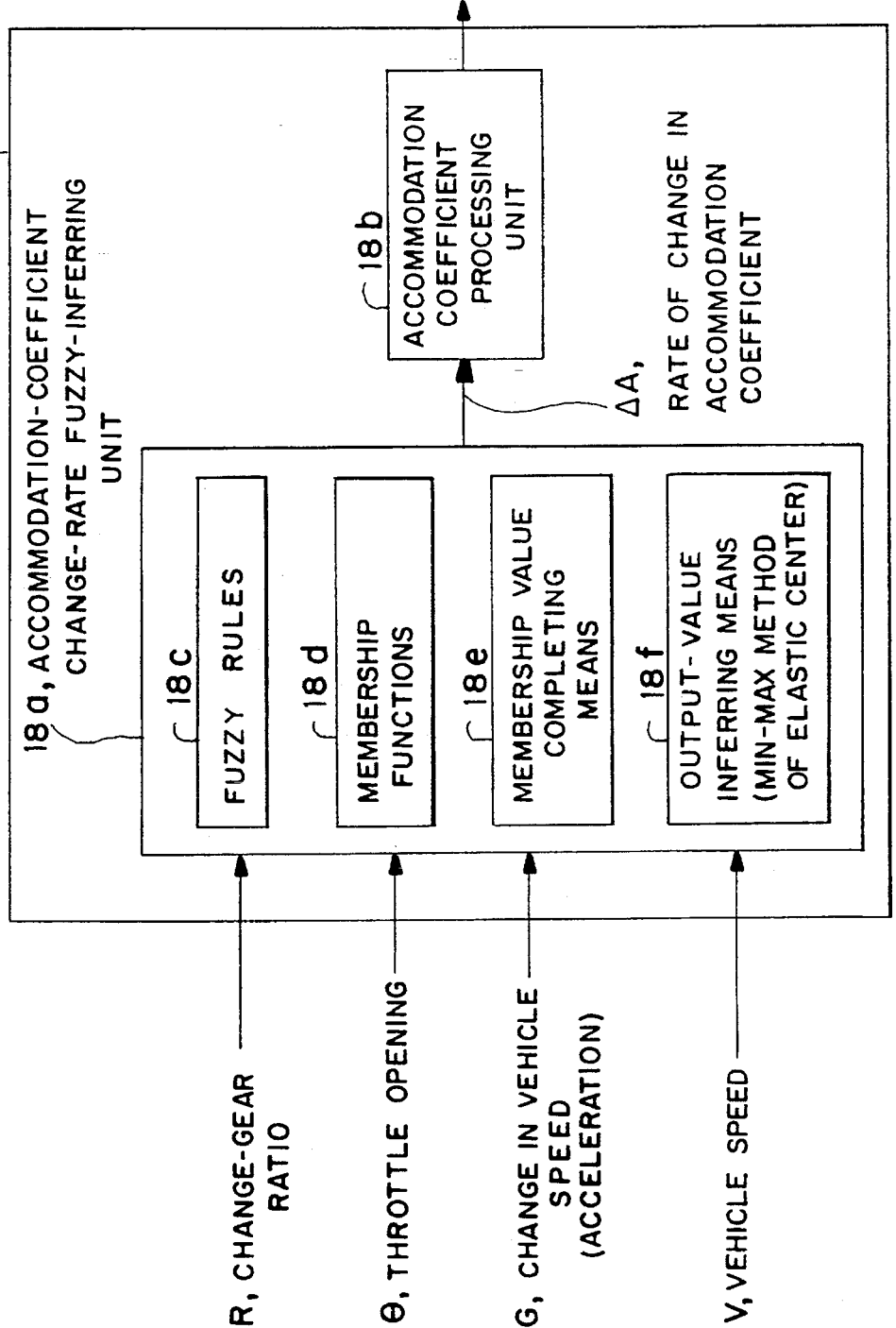

FIG. 3

ACTUAL EXAMPLES OF FUZZY RULES

RULE 1 : IF (SPEED IS LOW) AND (SHIRT IS HIGH)
THEN ($\Delta A$ IS FASTDOWN)

RULE 2 : IF (SPEED IS HIGH) AND (SHIRT IS LOW)
THEN ($\Delta A$ IS FASTUP)

RULE 3 : IF (THROT IS LOW) AND (SPEED IS HIGH)
THEN ($\Delta A$ IS FASTDOWN)

RULE 4 : IF (THROT IS LOW) AND (SPEED IS LOW)
THEN ($\Delta A$ IS SLOWDOWN)

RULE 5 : IF (THROT IS HIGH) AND (SPEED IS HIGH)
THEN ($\Delta A$ IS SLOWUP)

RULE 6 : IF (THROT IS HIGH) AND (SPEED IS LOW)
THEN ($\Delta A$ IS FASTUP)

RULE 7 : IF (ALF IS NEGATIVEBIG) AND (THROT IS LOW)
AND (SHIFT IS NOTVERYLOW)
THEN ($\Delta A$ IS FASTUP)

RULE 8 : IF (ALF IS POSITIVEBIG) AND (THROT IS CLOSE)
AND (SHIFT IS NOTLOW)
THEN ($\Delta A$ IS MIDDLEUP)

REMARKS:

SPEED : THE SPEED (V) OF THE VEHICLE
(KILOMETERS PER HOUR)

SHIFT : CHANGE-GEAR RATIO (R) FROM
0%(LOW) TO 100% (TOP)

THROT : THROTTLE OPENING
($\theta$) FROM 0% (MIN) TO 100%(MAX)

ALF : CHANGE IN VEHICLE SPEED
(ACCELERATION) (G) (METERS/SECOND PER SECOND)

$\Delta A$ : RATE OF CHANGE ($\Delta A$) IN ACCOMMODATION
COEFFICIENT A (% PER MILLISECOND)

ACTUAL EXAMPLES OF FUZZY VARIABLES
AND MEMBERSHIP FUNCTIONS

FIG. 4(a) MEMBERSHIP FUNCTION OF VEHICLE SPEED

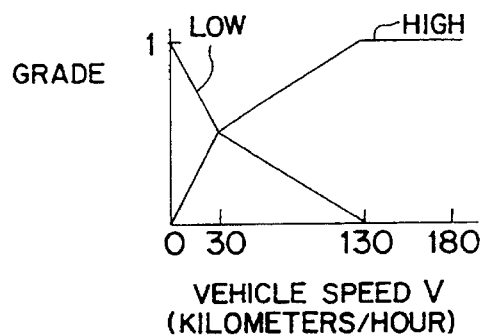

VEHICLE SPEED V
(KILOMETERS/HOUR)

FIG. 4(b) MEMBERSHIP FUNCTION OF THROTTLE RATIO

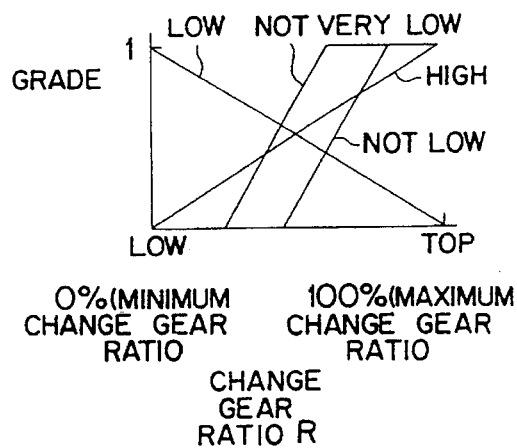

CHANGE GEAR RATIO R

FIG. 4(c) MEMBERSHIP FUNCTION OF THROTTLE OPENING

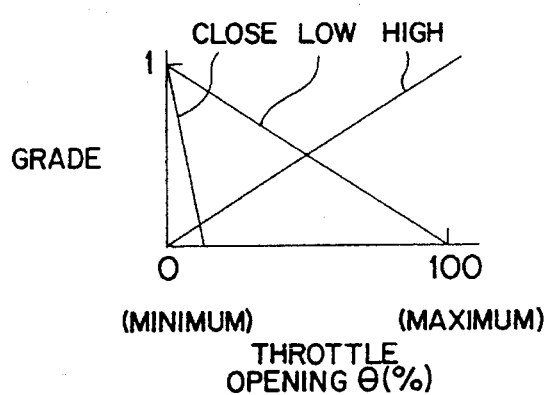

THROTTLE OPENING Θ(%)

FIG. 4(d) MEMBERSHIP FUNCTION OF CHANGE IN VEHICLE SPEED

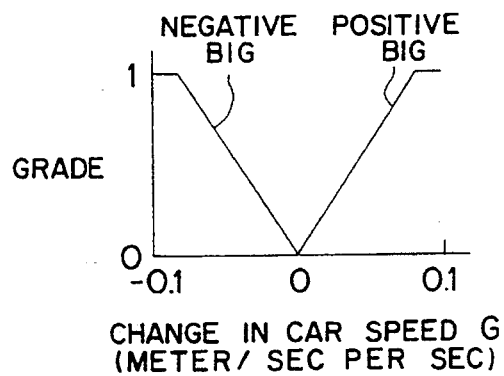

CHANGE IN CAR SPEED G
(METER/SEC PER SEC)

FIG. 4(e) MEMBERSHIP FUNCTION OF RATE OF CHANGE IN ACCOMMODATION COEFFICIENT

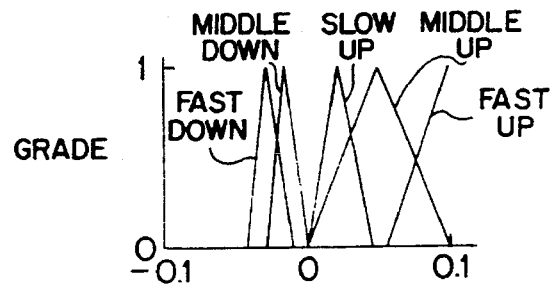

RATE OF CHANGE ΔA IN ACCOMMODATION
COEFFICIENT A (% PER MILLISECOND)

COMPUTATION OF TARGET-ENGINE-
ROTATATIONAL-SPEED-UPPER LIMIT NU
BY EIGHT-POINT INTERPOLATION

COMPUTATION OF TARGET-ENGINE-ROTATIONAL-SPEED LOWER LIMIT NL BY FOUR-POINT INTERPOLATION

RELATION BETWEEN CHANGES IN TARGET ENGINE ROTATIONAL SPEED AND CHANGES IN VEHICLE SPEED FOR A RATE OF CHANGE IN TARGET ENGINE ROTATIONAL SPEED OF 100

TRANSMISSION CONTROL APPARATUS FOR NONSTAGE TRANSMISSION OF VEHICLES

BACKGROUND OF THE INVENTION

1. Field of the Invention

The present invention relates to a transmission control apparatus of a nonstage transmission, wherein a target rotational speed of the engine or a range of rotational-speed values of the engine is set on the basis of the speed of the vehicle and an accommodation coefficient indicating the running state of the vehicle. The change-gear ratio of the nonstage transmission is controlled so as to achieve the target rotational speed of the engine or the range of rotational-speed values of the engine. In particular, the present invention relates to a transmission control apparatus of a nonstage transmission for vehicles wherein the accommodation coefficient is found by fuzzy inference based on demanded engine-output quantities such as the throttle opening and input quantities related to the running state such as the speed of the vehicle, the change-gear ratio and the rate of change in vehicle speed or the acceleration so as to provide smooth transmission control which can keep up with a variety of running states of the vehicle.

2. Description of the Background Art

A transmission control apparatus for a vehicle having a nonstage transmission, wherein a target rotational speed of the engine or a target speed ratio is set as a function of an induction-system throttle opening and vehicle speed, such as the one disclosed in Japanese Patent Laid Open No. Sho59-114850, is generally known. It should be noted that the speed ratio means a ratio of the rotational speed on the output side of the nonstage transmission to the rotational speed of the engine.

SUMMARY AND OBJECTS OF THE INVENTION

In the case of the conventional transmission apparatus wherein a target rotational speed of the engine or a target speed ratio is set as a function of an induction-system throttle opening and vehicle speed, when the engine is set on the assumption of an ordinary running mode such as the level-land running mode, feedback control is inevitably carried out in another mode such as the downhill-road mode or the uphill-road mode in order to make a transition from the ordinary running mode to the other mode. As a result, the conventional transmission apparatus has a problem that it is difficult to provide the driver with a driving feeling in accordance with what is desired by the driver.

Addressing the problem described above, with the present invention, an attempt is made to provide the driver with a driving feeling adjusted to the running state of the vehicle by introducing a new conceptual quantity called an accommodation coefficient for indicating the running state wherein the driving feeling is obtained through the execution of the steps of:

presetting a target rotational speed of the engine or a range of rotational-speed values of the engine on the basis of the speed of the vehicle and the accommodation coefficient; and changing the target rotational speed of the engine in accordance with the accommodation coefficient.

To be more specific, it is an object of the present invention to provide the driver with a driving feeling faithfully keeping up with a variety of running states of the vehicle and running requirements of the driver by executing the steps of:

directly computing the accommodation coefficient by fuzzy inference based on fuzzy rules set in advance with demanded engine-output quantities such as the throttle opening, the speed of the vehicle and the change-gear ratio as well as a variety of kinds of data related to the running state such as and the rate of change in vehicle speed or the acceleration used as input conditions or, as an alternative, computing the accommodation coefficient after finding rates of change in accommodation coefficient by fuzzy inference; and obtaining values of the accommodation coefficient faithfully keeping up with the various running states of the vehicle and the running requirements of the driver and executing transmission control to result in rotational speeds of the engine set on the basis of these accommodation coefficient values.

In order to solve the problem described above, the present invention provides a transmission control apparatus for a nonstage transmission of a vehicle characterized in that the transmission control apparatus comprises:

a target engine rotational-speed setting means for setting a target rotational speed of the engine or a range of rotational-speed values of the engine in accordance with at least the speed of the vehicle and an accommodation coefficient indicating the running state of the vehicle;

an accommodation coefficient fuzzy-inferring means for inferring an accommodation coefficient from inputs including demanded engine-output quantities, the speed of the vehicle, the change-gear ratio and the rate of change in vehicle speed or the acceleration on the basis of fuzzy rules set in advance or, as an alternative, inferring with the rate of change in accommodation coefficient and then deriving an accommodation coefficient from the inferred rate of change; and a change-gear-ratio controlling means for controlling the change-gear ratio of the nonstage transmission on the basis of the accommodation coefficient derived by the accommodation coefficient fuzzy-inferring means so as to result in the target rotational speed of the engine or the range of rotational-speed values of the engine set by the target engine rotational-speed setting means.

The transmission control apparatus for a nonstage transmission of a vehicle provided by the present invention executes the steps of:

inferring an accommodation coefficient from inputs including demanded engine-output quantities, the speed of the vehicle, the change-gear ratio and the rate of change in vehicle speed or the acceleration on the basis of fuzzy rules set in advance or, as an alternative, inferring the rate of change in accommodation coefficient and then deriving an accommodation coefficient from the inferred rate of change;

setting a target rotational speed of the engine or a range of rotational-speed values of the engine in accordance with at least the speed of the vehicle and the accommodation coefficient inferred or derived at the previous step; and controlling the change-gear ratio of the nonstage transmission so as to result in the target rotational speed of the engine or the range of rotational-speed values of the engine set at the immediately previous step.

The transmission control apparatus provided by the present invention is configured so that a target rotational speed of the engine or a range of rotational-speed values of the engine is set in accordance with at least the speed of the vehicle and an accommodation coefficient which indicates the running state of the vehicle. Accordingly, values of the accommodation coefficient faithfully keeping up with the various running states of the vehicle and the running requirements of the driver can be obtained and transmission control can then be executed to result in rotational speeds of the engine set on the basis of these accommodation coefficient values. As a result, the driver is provided with a driving feeling which faithfully keeps up with various running states of the vehicle and the running requirements of the driver.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a block diagram showing a configuration of an accommodation coefficient fuzzy-inferring means;

FIG. 3 is an explanatory diagram showing actual examples of fuzzy rules;

FIG. 4(a), 4(b), 4(c), 4(d) and 4(e) are explanatory diagrams showing actual examples of fuzzy variables and membership functions;

DETAILED DESCRIPTION OF THE PREFERRED EMBODIMENTS

Figure 1:
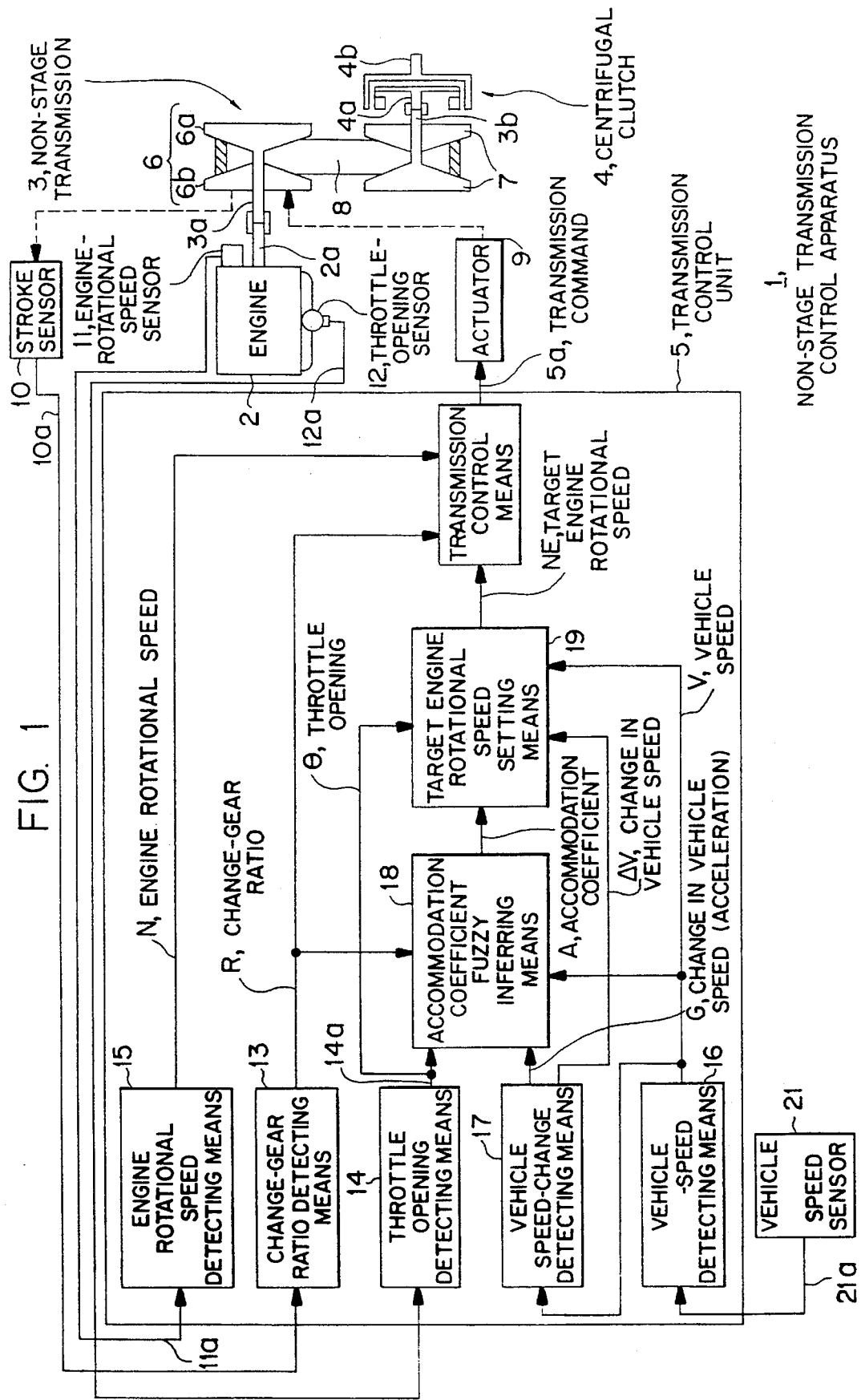
FIG. 1 is a diagram showing the overall configuration of a transmission control apparatus for a nonstage transmission of a vehicle provided by the present invention.

A diagram of an overall configuration of a transmission control apparatus 1 provided by the present invention for nonstage transmissions of vehicles is shown in FIG. 1.

As shown in FIG. 1, the transmission control apparatus 1 comprises, among other components, machinery 2 such as an engine, a nonstage transmission 3 with a loop belt, a centrifugal clutch 4 and a transmission control unit 5 adopting the fuzzy inference.

An output axis 2a of the engine 2 is linked to an input axis 3a of the nonstage transmission 3 whereas an output axis 3b of the nonstage transmission 3 is joined to an input axis 4a of the centrifugal clutch 4. The output axis 4a of the centrifugal clutch 4 is so configured that rotative power is transmitted to a driving wheel, not shown in FIG. 1, through a gear mechanism and other parts which are also not shown in FIG. 1.

As described earlier, the nonstage transmission 3 has a loop belt 8 which rotates between a pair of driving pulleys 6 and a couple of passive (driven) pulleys 7. The loop belt 8 has a cross-sectional area that resembles an isosceles trapezoid. The nonstage transmission 3 drives an actuator 9, varying the pulley gap between the two driving pulleys 6. In the case of the transmission control apparatus 1 shown in FIG. 1, the driving pulley 6a on the right side is fixed and the driving pulley 6b on the left side can be moved in the axial direction to vary the gap between the two driving pulleys 6a and 6b. Much like the driving pulleys 6, one of the two passive pulleys 7 is fixed on the output axis 3b while the other one is installed in such a way that it can be moved in the axial direction. The surface of the driving pulley 6a in contact with the loop belt 8 is taper. Likewise, the surface of the driving pulley 6b in contact with the loop belt 8 is also taper. These contact surfaces each become gradually smaller toward the axis 3a so that the distance from one of the contact surfaces to the other increases in the centrifugal radial direction. Much like the driving pulley 6a, the surface of the passive pulley 7a in contact with the loop belt 8 is taper.

Likewise, the surface of the passive pulley 7b in contact with the loop belt 8 is also taper. These contact surfaces each become gradually smaller toward the axis 3b so that the distance from one of the contact surfaces to the other increases in the centrifugal radial direction. The radius of the loop belt 8 in contact with the driving pulleys 6 thus decreases as the distance from one of the contact surfaces of the driving pulleys 6 to the other increases and vice versa. Similarly, the radius of the loop belt 8 in contact with the passive pulleys 7 thus also decreases as the distance from one of the contact surfaces of the passive pulleys 7 to the other increases and vice versa. The changes in radii result in variations in change-gear ratio and transmission torque.

The actuator 9 is equipped with a motor and a driving mechanism for shifting the driving pulley 6b by means of the rotational output of the motor. To be more specific, the actuator 9 controls the position of the driving pulley 6b in accordance with a transmission command 5a issued by a transmission control unit 5.

A stroke sensor 10 is used for monitoring the position of the driving pulley 6b, supplying an electrical signal 10a representing the position to the transmission control unit 5.

An engine rotational speed sensor 11 provides the transmission control unit 5 with a pulse signal 11a, the period of which represents the rotational speed of the output axis 2a of the engine 2. Rotational speed means the number of rotations per unit time.

A throttle-opening sensor 12 is used for monitoring the throttle opening of an induction system employed in the engine 2, providing the transmission control unit 5 with an electrical signal 12a which represents the throttle opening. In this embodiment, the throttle opening of the engine 2 is regarded as the quantity of a demanded output of the engine 2.

It should be noted that the quantity of the demanded output of the engine can also be detected by means of an inflow-air-quantity detector or a negative pressure detector for monitoring the negative pressure of an induction pipe.

The transmission control unit 5 comprises a change-gear ratio detecting means 13, a throttle-opening detecting means 14, an engine rotational speed detecting means 15, a vehicle-speed detecting means 16, a vehicle speed change detecting means 17, an accommodation coefficient fuzzy-inferring means 18, a target engine rotational speed setting means 19 and a change-gear ratio controlling means 20.

The change-gear ratio detecting means 13 is provided with a pulley position and change-gear ratio data table showing relations between the position of the driving pulley 6b and the change-gear ratio R. The pulley position and change-gear ratio data table is stored in advance in the change-gear ratio detecting means 13. Based on the electrical signal 10a output by the stroke sensor 10, the change-gear ratio detecting means 13 outputs digital information on the change-gear ratio R of the nonstage transmission 3. It should be noted that the digital information is referred to hereafter merely as the change-gear ratio R.

It should be noted that the change-gear ratio detecting means 13 typically inputs the rotational speeds on the input and output sides of the nonstage transmission 3 and finds the change-gear ratio, a ratio of the former to the latter, by calculation. As described above, rotational speed means the number of rotations per unit time. In this case, an output rotation sensor is installed on the output axis 3b of the nonstage transmission 3 for monitoring the rotational speed of the output axis 3b. It should be noted that this output rotation sensor itself is not shown in FIG. 1. The change-gear ratio R is then found as a ratio of a detection output generated by the engine rotational speed sensor 11 to a detection output generated by this output rotation sensor. It should be noted that, in the case of the nonstage transmission wherein the change-gear ratio R is found as a ratio of the rotational speed on the input side to that on the output side thereof as described above, the stroke sensor 10 is not required.

The throttle-opening detecting means 14 outputs digital information e on the throttle opening based on the electrical signal 12a output by the throttle-opening sensor 12. The digital information Θ is referred to hereafter merely as the throttle opening. It should be noted that, in this embodiment, the throttle opening is expressed in terms of percents with 0% and 100% used for representing the minimum and maximum throttle openings, respectively.

Typically, the throttle-opening sensor 12 employs a potentiometer, a variable resistor interlocked with the opening of an induction throttle, outputting a voltage from the potentiometer which represents the throttle opening. In this case, the throttle-opening detecting sensor 14 is provided with an A/D converter for converting the voltage representing the throttle opening into a digital voltage signal, and a throttle-opening table for storing relations between the digital voltage signal output by the A/D converter and the throttle opening in advance. Receiving a digital voltage signal, the throttle-opening detecting sensor 14 searches the throttle-opening table for a value of the throttle opening corresponding to the digital voltage signal, and if necessary, the throttle opening Θ is found by interpolation of results of the search operation.

The engine rotational speed detecting means outputs information N on the rotational speed of the engine 3 which is found from the pulse period of the pulse signal 11a received from the engine rotational speed sensor 11. By the rotational speed, the number of rotations per unit time is meant as described earlier. It should be noted that the information N is referred to hereafter merely as the number of engine rotations.

The vehicle-speed detecting means 16 outputs digital information V on the speed of the vehicle which is found from a detection signal 21a generated by the vehicle-speed sensor 21. It should be noted that the digital information V is referred to hereafter merely as the speed of the vehicle.

The vehicle-speed sensor 21 is typically a transducer which is used for generating a train of periodical pulses at time intervals each representing the rotational speed of the output axis 4b employed in the centrifugal clutch 4 or the rotational speed of the wheels employed by the vehicle equipped with the transmission control apparatus.

As described above, the speed V of the vehicle is found from the detection signal 21a output by the vehicle-speed sensor 21 and, typically, the detection signal 21a is a train of pulses generated at intervals each representing the rotational speed, that is, a train of pulses with a period inversely proportional to the rotational speed. In this case, the speed V of the vehicle can be found by measuring the time gap between two consecutive pulses of the pulse train. With this technique, however, an average speed of the vehicle cannot necessarily be obtained. Therefore, the time gap between two consecutive pulses is measured N times and then an average speed of the vehicle is found by calculation including the division of a sum of the measured time gaps by N.

As an alternative, the time gap between the first and the last of M consecutive pulses is measured and then an average speed of the vehicle is found by computation including the division of the measured time gap by (M−1).

The vehicle-speed-change detecting means 17 computes a change in vehicle speed ΔV from values of the vehicle speed V sequentially output by the vehicle-speed detecting means 16 and then finds the acceleration G, a change in vehicle speed per unit time. To be more specific, a current vehicle speed and a previous vehicle speed are obtained to give a difference or a change in vehicle speed ΔV and, at the same time, a period between points of time at which the current and previous vehicle speeds are obtained is measured. The change in vehicle speed per unit time (or the acceleration) G is then calculated by dividing the change in vehicle speed ΔV by the measured period between the two points of time.

In this embodiment, the change in vehicle speed per unit time G (or the acceleration) is computed from variations in vehicle speed. It should be noted, however, that an acceleration sensor can also be employed as an alternative for monitoring the acceleration and the monitored acceleration can be used as the change in vehicle speed per unit time G.

In addition, the change in vehicle speed ΔV can be calculated as differences between vehicle speeds obtained at time intervals determined in advance. In this case, the calculated change in vehicle speed ΔV can be treated as a quantity corresponding to the change in vehicle speed per unit time (or the acceleration) G.

Inputting the change-gear ratio R, the throttle opening Θ, the speed V of the vehicle and the change in vehicle speed per unit time (or the acceleration) G, the accommodation coefficient fuzzy-inferring means 18 infers a rate of change ΔA in accommodation coefficient A by using fuzzy rules set in advance. The inferred rate of change ΔA in accommodation coefficient A is then used to calculate a most recent value of the accommodation coefficient A.

A block diagram of the configuration of the accommodation coefficient fuzzy-inferring means is shown in FIG. 2.

As shown in FIG. 2, the configuration of the accommodation coefficient fuzzy-inferring means includes an accommodation coefficient change-rate fuzzy-inferring unit 18a and an accommodation coefficient processing unit 18b.

The accommodation coefficient change-rate fuzzy-inferring unit 18a is further equipped with a plurality of fuzzy rules 18c, a plurality of membership functions 18d, a membership-value computing means 18e and an output-value inferring means 18f.

An explanatory diagram showing actual examples of the fuzzy rules is shown in FIG. 3.

In this embodiment, eight fuzzy rules are provided for inferring the rate of change ΔA in accommodation coefficient A.

Rules 1 and 2 focus on relations between the speed V of the vehicle and the change-gear ratio R. Rules 3 to 6 focus on relations between the throttle opening Θ and the speed V of the vehicle. Rules 7 and 8 focus on relations between the throttle opening Θ and the change-gear ratio R. As shown in FIG. 3, the rules are each described in an IF-THEN format.

Explanatory diagrams showing actual examples of fuzzy variables and the membership functions are depicted in FIG. 4.

In this embodiment, membership functions for the speed V of the vehicle, the change-gear ratio R, the throttle opening Θ and the rate of change in vehicle speed per unit time (or the acceleration) G are provided as antecedent membership functions while that for the rate of change ΔA in accommodation coefficient A is provided as consequent membership functions.

In the case of a membership function for the speed of the vehicle shown in FIG. 4(a), the horizontal and vertical axes represent the speed V of the vehicle and the grade (or the degree to which the speed of the vehicle belongs to a fuzzy set), respectively. The membership function defines the degree to which a value of the speed V of the vehicle belongs to grades 'Low' and 'High' fuzzy sets of small and large values of the speed V of the vehicle, respectively. The membership function for the change-gear ratio R shown in FIG. 4(b) defines the degree to which a value of the change-gear ratio R in the range 0 to 100% (or Low to Top) belongs to grades 'Low', 'Not Very Low', 'Not Low' and 'High', the fuzzy sets for small, not very small, not small and large values of the change-gear ratio R, respectively.

The membership function for the throttle opening Θ shown in FIG. 4(c) defines the degree to which a value of the throttle opening Θ belongs to grades 'Close', 'Low' and 'High'. The grade 'Close' is a fuzzy set for the closed throttle opening Θ whereas the grades 'Low' and 'High' are fuzzy sets for small and large values of the throttle opening Θ, respectively.

The membership function for the rate of change in vehicle speed (the acceleration) G shown in FIG. 4(d) defines the degree to which a value of the rate of change in vehicle speed (the acceleration) G belongs to grades 'Negative Big' and 'Positive Big', the fuzzy sets for large values in the negative and positive directions of the rate of change in vehicle speed (the acceleration) G, respectively.

The membership function for the rate of change ΔA in accommodation coefficient A shown in FIG. 4(e) defines the degree to which a value of the rate of change ΔA in accommodation coefficient A of the horizontal axis belongs to grades 'Fast Down', 'Slow Down', 'Slow Up', 'Middle Up' and 'Fast Up', the fuzzy sets for rapidly decreasing, slowly decreasing, slowly increasing, increasing and rapidly increasing values of the rate of change ΔA in accommodation coefficient A, respectively.

Inputting values of the speed V of the vehicle, the change-gear ratio R, the throttle opening Θ and the rate of change in vehicle speed (or the acceleration) G, the membership-value computing means 18e inside the accommodation coefficient change-rate fuzzy-inferring unit 18a shown in FIG. 2 finds their values of membership to the fuzzy sets for the speed V of the vehicle, the change-gear ratio R, the throttle opening Θ and the rate of change in vehicle speed (acceleration) G are shown in FIG. 4(a) to FIG. 4(d). The membership values are used in conjunction with the fuzzy rules shown in FIG. 3 and the consequent conditions (or the fuzzy sets of the rate of change ΔA in accommodation coefficient A shown in FIG. 4(e) as described earlier) for determining a membership function of the rate of change ΔA in accommodation coefficient A for each of the fuzzy rules.

From the membership functions of the rate of change ΔA in accommodation coefficient A determined for the individual fuzzy rules, the output-value inferring means 18f infers a synthetic rate of change by means of the Min-Max method of elastic center. From the inferred synthetic rate of change, the output-value inferring means 18f outputs a value of the rate of change ΔA in accommodation coefficient A.

By using values of the rate of change ΔA in accommodation coefficient A supplied sequentially one after another by the accommodation coefficient change rate fuzzy-inferring unit 18a, the accommodation coefficient processing unit 18b corrects the value of the accommodation coefficient A computed previously to find and output the most recent value of the accommodation coefficient A.

In this embodiment, the rate of change ΔA in accommodation coefficient A is found as a rate of change expressed in terms of percents. The accommodation coefficient processing unit 18b measures a period between points of time at which immediately previous and current values of the rate of change ΔA in accommodation coefficient A are output. The accommodation coefficient processing unit 18b then computes the product of the period between the points of time and the current value of the rate of change ΔA in the accommodation coefficient A to give a change in the accommodation coefficient A which is added to or subtracted from the value of the accommodation coefficient A computed previously to result in a most recent value of the accommodation coefficient A. It should be noted that the initial value of the accommodation coefficient A is set at 0%.

It should be kept in mind that, in this embodiment, the accommodation coefficient A is treated by expressing the values thereof in terms of percents in a range between a minimum of 0% and a maximum of 100%. Accordingly, the accommodation coefficient processing unit 18b rounds up negative values of the accommodation coefficient A found by calculation to the minimum 0%. On the other hand, the accommodation coefficient processing unit 18b rounds down values of the accommodation coefficient A greater than 100% found by calculation to the maximum 100%.

Figure 5:
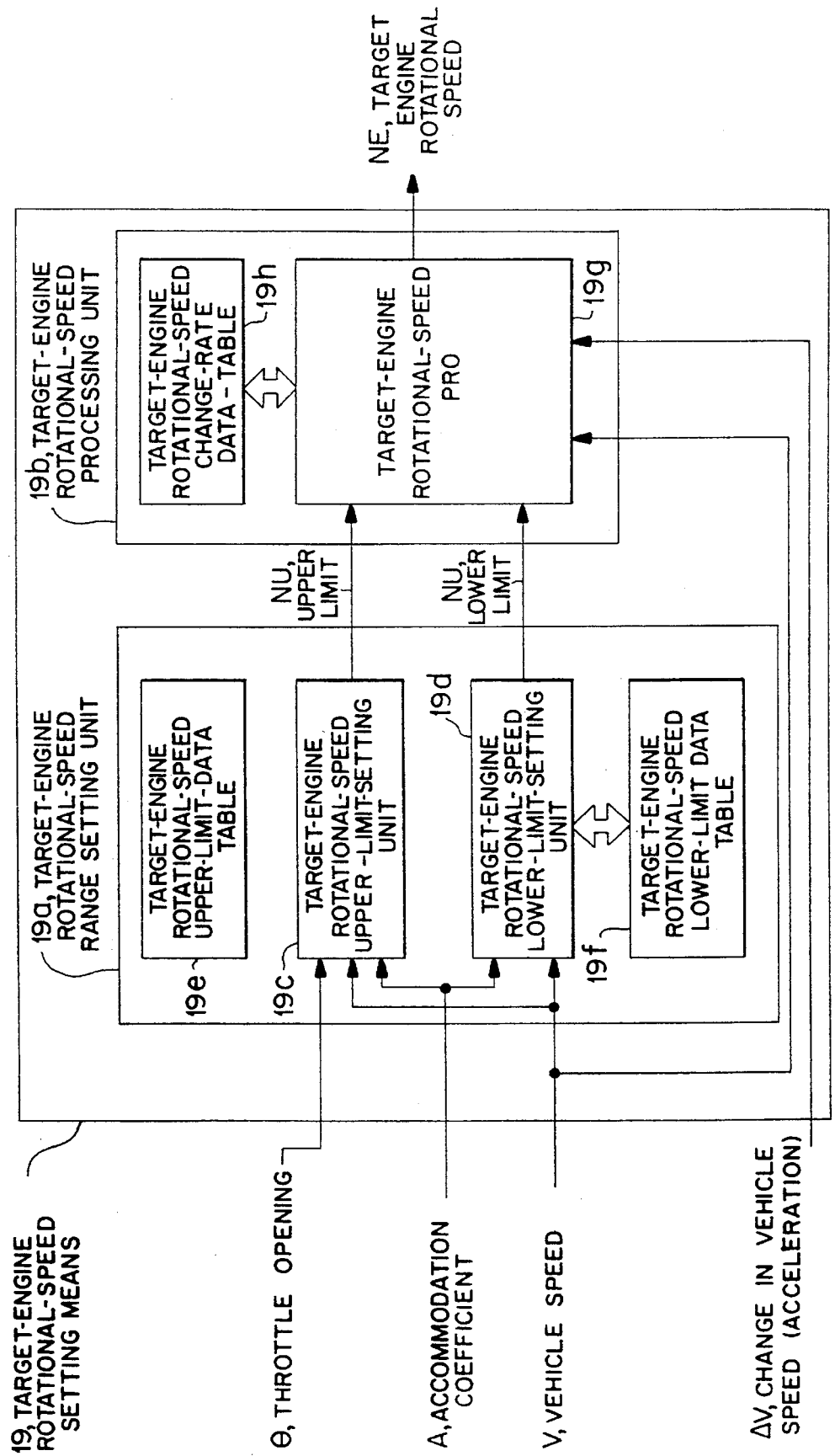
FIG. 5 is a block diagram showing a configuration of a target engine rotational speed setting means.

A block diagram of the configuration of the target engine rotational speed setting means 19 is shown in FIG. 5.

As shown in FIG. 5, the target engine rotational speed setting means 19 comprises a target engine rotational speed range setting unit 19a and a target engine rotational speed processing unit 19b.

The target engine rotational speed range setting unit 19a is further equipped with a target engine rotational speed upper limit setting unit 19c, a target engine rotational speed lower limit setting unit 19d, a target engine rotational speed upper limit data table 19e and a target engine rotational speed lower limit data table 19f.

Figure 6:
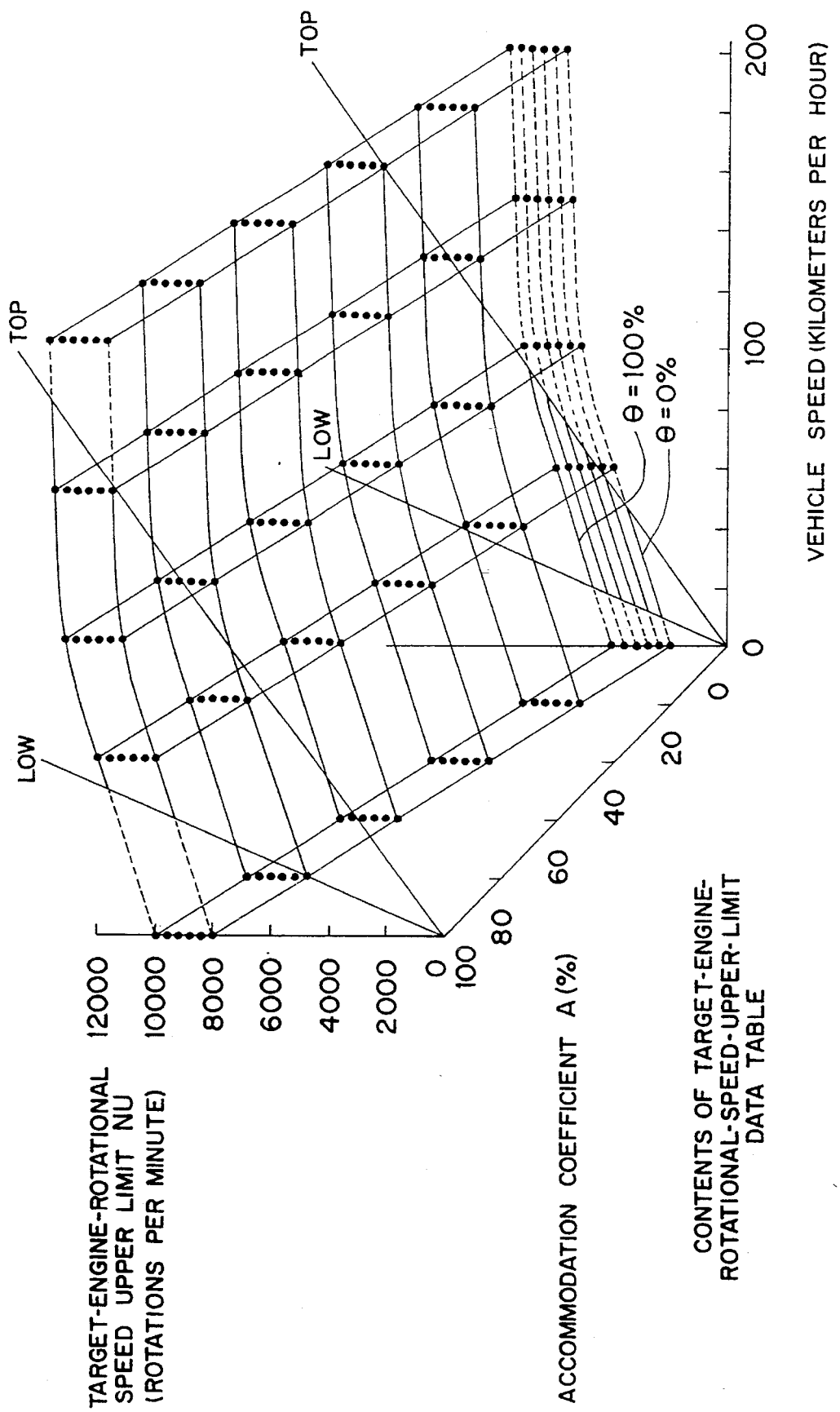
FIG. 6 shows graphs representing the contents of a target engine rotational speed upper limit data table.
Figure 7:
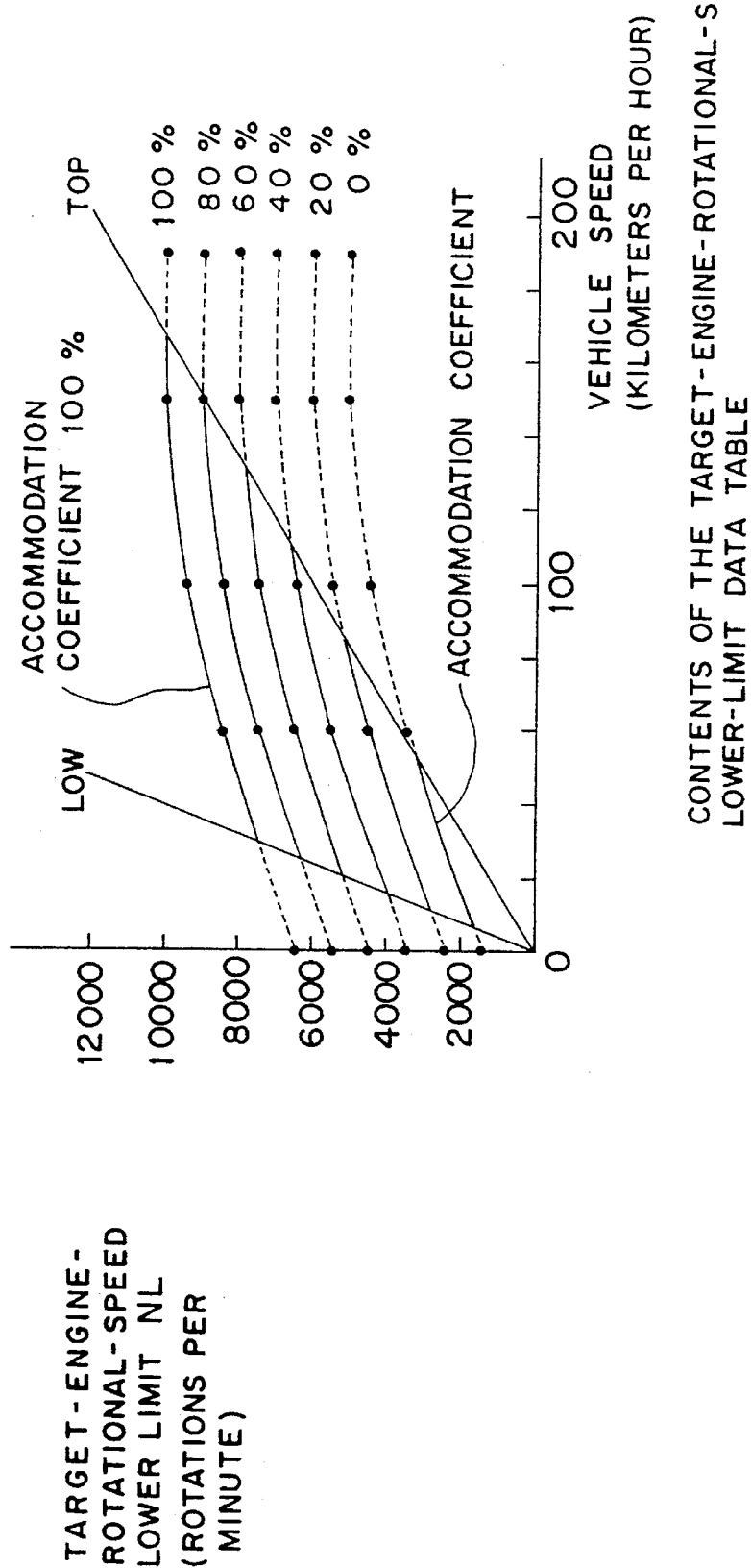
FIG. 7 shows graphs representing the contents of a target engine rotational speed lower limit data table.

Graphs representing the contents of the target engine rotational speed upper limit data table 19e and the target engine rotational speed lower limit data table 19f are shown in FIGS. 6 and 7 respectively.

The target engine rotational speed upper limit data table 19e is used for storing upper-limit data set in advance on the basis of three parameters (or input conditions): the speed V of the vehicle, the accommodation coefficient A and the throttle opening Θ. The data is set in such a way that, the higher the speed V of the vehicle and the greater the accommodation coefficient A, the greater the target engine rotational speed upper limit value NU. Furthermore, the data is also set so that, the greater the throttle opening Θ, the greater the target engine rotational speed upper limit value NU for the same values of the speed V of the vehicle and the accommodation coefficient A.

Likewise, the target engine rotational speed lower limit data table 19f is used for storing lower limit data set in advance on the basis of two parameters (or input conditions): the speed V of the vehicle and the accommodation coefficient A. The data is set in such a way that, the higher the speed V of the vehicle and the greater the accommodation coefficient A, the greater the target engine rotational speed lower limit value NL.

Figure 8:
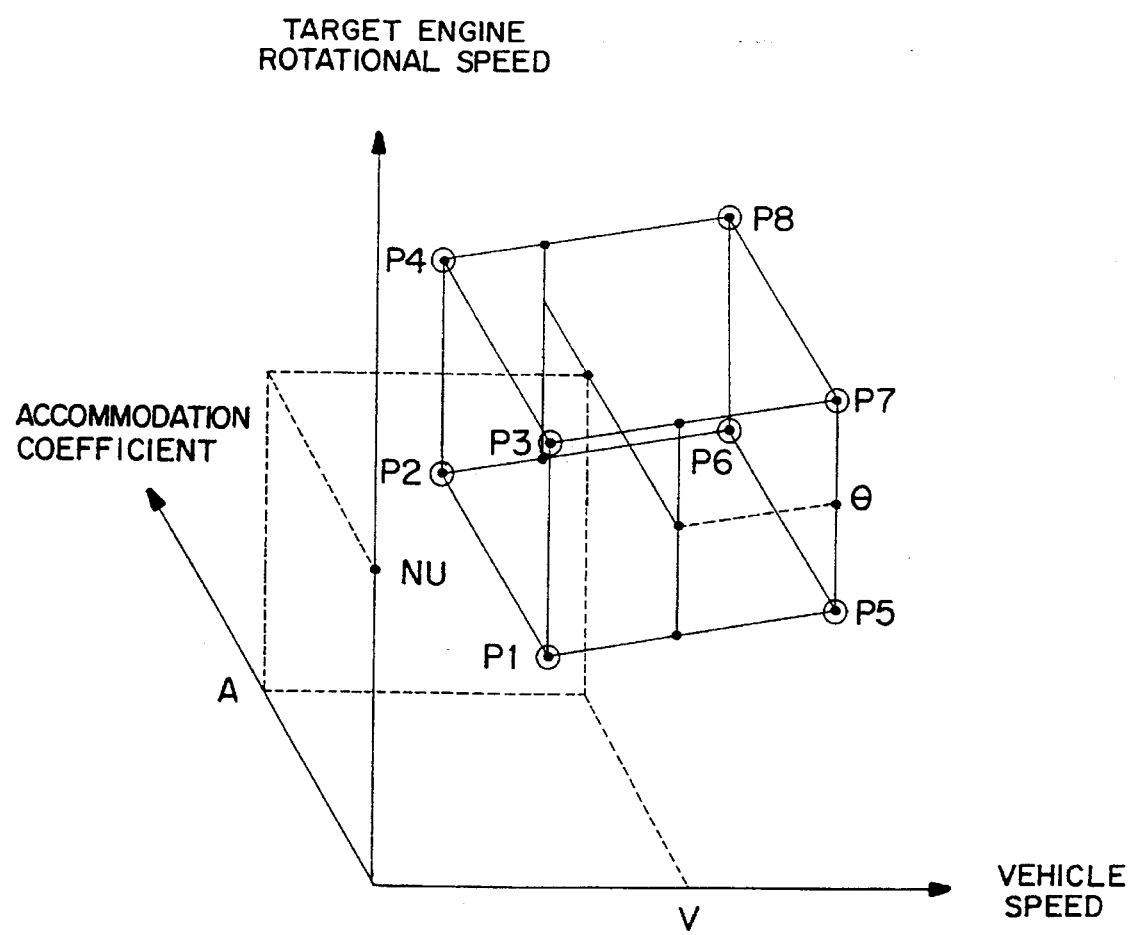
FIG. 8 is an explanatory diagram used for describing a method of finding a target engine rotational speed upper limit value by means of an eight-point linear-interpolation technique.

FIG. 8 is an explanatory diagram used for describing an eight-point interpolation technique for finding a target engine rotational speed upper limit value NU.

Receiving the speed V of the vehicle supplied by the vehicle-speed detecting means 16, the accommodation coefficient A supplied by the accommodation coefficient fuzzy-inferring means 18 and the throttle opening e supplied by the throttle-opening detecting means 14, the target engine rotational speed upper limit setting unit 19c shown in FIG. 5 picks up a couple of the closest points sandwiching the speed V of the vehicle, a couple of the closest points sandwiching the accommodation coefficient A and a couple of the closest points sandwiching the throttle opening Θ. The target engine rotational speed upper limit setting unit 19c then reads three pairs of engine rotational speed upper limit data from the target engine rotational speed upper limit data table 19e with each pair corresponding to each of the couples of closest points picked up as described above. The three pairs of engine rotational speed upper limit data read from the target engine rotational speed upper limit data table 19e each serve as the limits of a range of values. The ranges of values are drawn in FIG. 8 as three adjacent sides of a cube with eight corner points P1 to P8. The eight points P1 to P8 are used as a base by the eight-point interpolation technique for finding the target engine rotational speed upper limit value NU.

Figure 9:
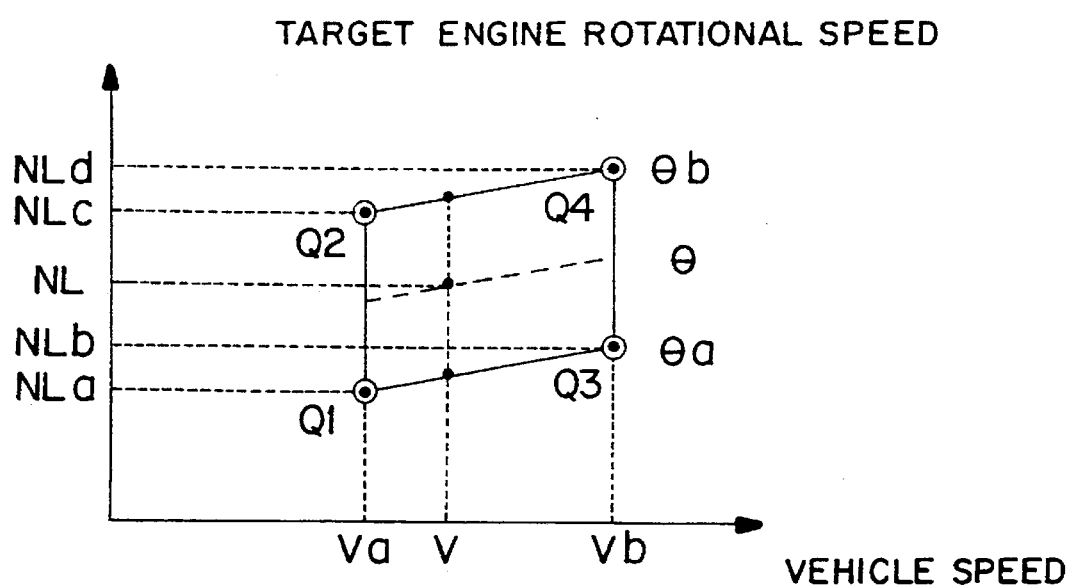
FIG. 9 is an explanatory diagram used for describing a method of finding a target engine rotational speed lower limit value by mean of an four-point linear-interpolation technique.

FIG. 9 is an explanatory diagram used for describing a four-point interpolation technique for finding a target engine rotational speed lower limit value NL.

Receiving the speed V of the vehicle supplied by the vehicle-speed detecting means 16 and the accommodation coefficient A supplied by the accommodation coefficient fuzzy-inferring means 18, the target engine rotational speed lower limit setting unit 19d shown in FIG. 5 picks up a couple of the closest points sandwiching the speed V of the vehicle and a couple of closest points sandwiching the accommodation coefficient A. The target engine rotational speed lower limit setting unit 19d then reads two pairs of engine rotational speed lower limit data from the target engine rotational speed lower limit data table unit with each pair corresponding to each of the couples of closest points picked up as described above. The two pairs of engine rotational speed lower limit data read from the target engine rotational speed lower limit data table 19f each serve as the limits of a range of values. The ranges of values are drawn in FIG. 8 as two adjacent sides of a square with four corner points Q1 to Q4. The four points Q1 to Q4 are used as a base by the four-point interpolation technique for finding the target engine rotational speed lower limit value NL.

The target engine rotational speed processing unit 19b shown in FIG. 5 is equipped with a target engine rotational speed processing means 19g and a target engine rotational speed change rate data table 19h.

The target engine rotational speed change rate data table 19h is used for storing rates of change in target engine rotational speed N for values of the speed V of the vehicle in advance.

Figure 10:
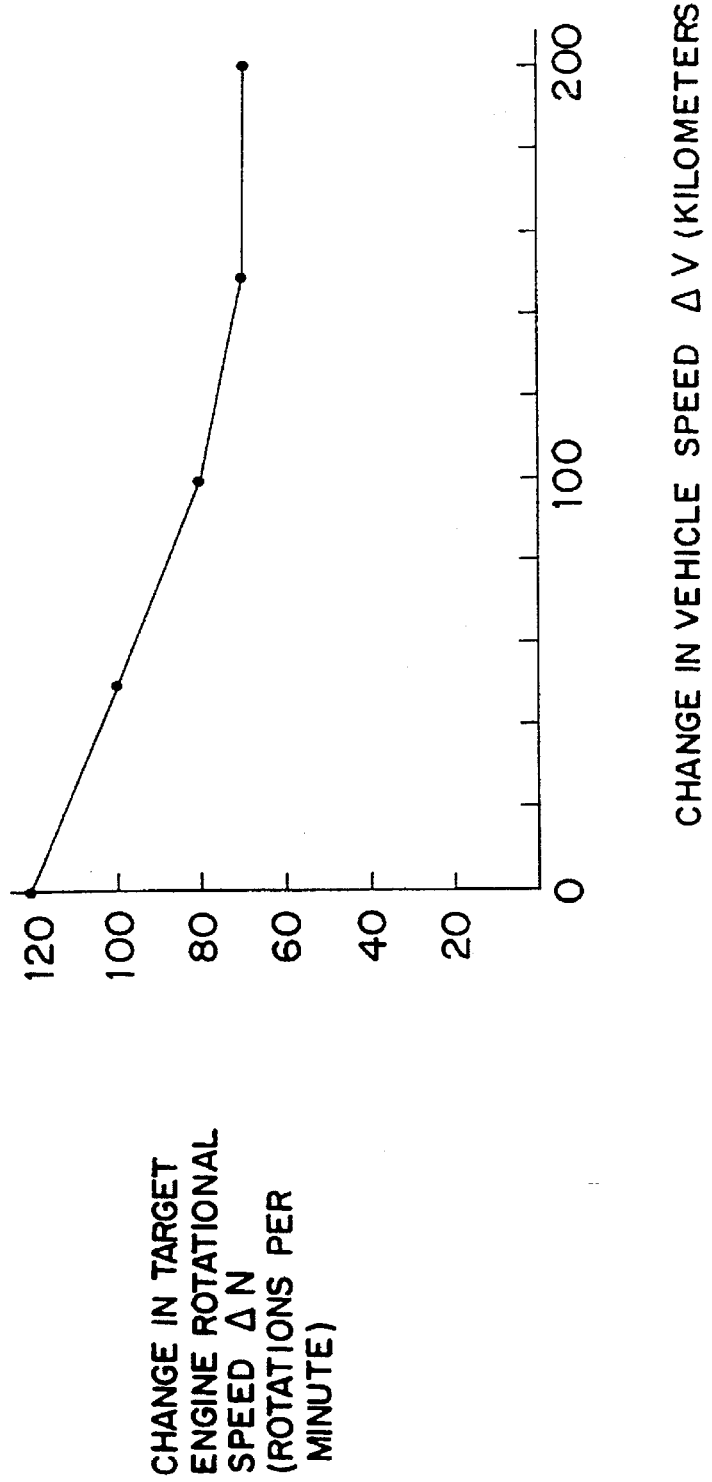
FIG. 10 shows a graph representing the contents of a target engine rotational speed change rate data table.

A graph representing the contents of the target engine rotational speed change rate data table 19h is shown in FIG. 10.

As shown in FIG. 10, data is set in the target engine rotational speed change rate data table 19h so that the rate of change in target engine rotational speed N is high for low values of the speed V of the vehicle. As the speed V of the vehicle is increased, however, the rate of change in target engine rotational speed N decreases.

Receiving a value of the speed V of the vehicle monitored by the vehicle-speed detecting means 16, the target engine rotational speed processing means 19g searches the target engine rotational speed change rate data table 19h for a target engine rotational speed change rate for the speed V of the vehicle. The target engine rotational speed change rate is then multiplied by a change in vehicle speed ΔV received from the vehicle speed change detecting means 17 to give a target change ΔN in engine rotational speed N.

Figure 11:
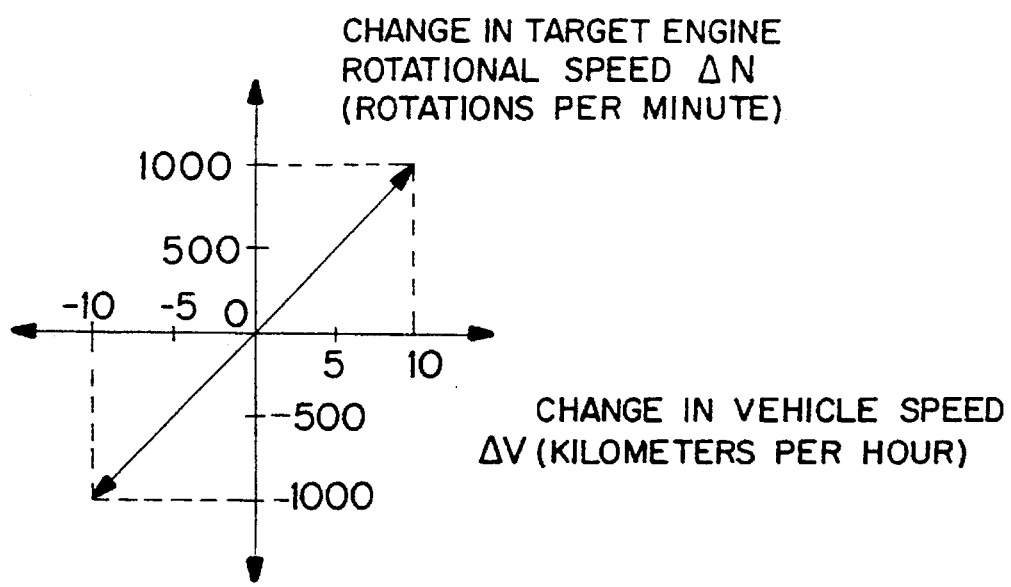
FIG. 11 shows a graph representing a relation between changes in vehicle speed and changes in target engine rotational speed.

A graph representing a relation between changes in vehicle speed ΔV and changes in target engine rotational speed ΔN is shown in FIG. 11.

FIG. 11 shows a relation for a rate of change in target engine rotational speed of 100 rotations per 1 kilometer/hour. For a change in vehicle speed ΔV of +10 kilometer/hour, for example, the change in target engine rotational speed ΔN is an increase of 1,000 rotations. For a change in vehicle speed ΔV of −10 kilometer/hour, on the other hand, the change in target engine rotational speed ΔN is a decrease of 1,000 rotations. Then, the target engine rotational speed processing means 19g adds the change in target engine rotational speed ΔN to or subtracts the change in target engine rotational speed ΔN from a target engine rotational speed NE found previously to give a new target engine rotational speed NE. If the new target engine rotational speed NE is within a range between the upper-limit value NU and the lower-limit value NL, the new target engine rotational speed NE is then output as it is. If the new target engine rotational speed NE is greater than the upper-limit value NU, however, the upper-limit value NU is then output as a new target engine rotational speed NE. If the new target engine rotational speed NE is smaller than the lower limit value NL, on the other hand, the lower limit value NL is then output as a new target engine rotational speed NE. It should be noted that the target engine rotational speed processing means 19g is designed so that processing is carried out with the target engine rotational speed lower limit value NL for a vehicle speed of zero used as an initial value of the target engine rotational speed NE.

The change-gear ratio controlling means 20 shown in FIG. 1 compares the target engine rotational speed NE output by the target engine rotational speed setting means 19 to the actual rotational speed N of the engine detected by the engine rotational speed detecting means 15, issuing a speed-change command 5a to make the actual rotational speed N of the engine equal to the target engine rotational speed NE. In this way, the change-gear ratio controlling means 20 carries out feedback control of the change-gear ratio R. When the change-gear ratio R goes beyond a range between a minimum change-gear ratio (Low) and a maximum change-gear ratio (Top) of the nonstage transmission 3, the change-gear ratio controlling means 20 discontinues the feedback control, outputting a speed-change command 5a for setting the change-gear ratio R to the minimum change-gear ratio (Low) or the maximum change-gear ratio (Top) instead.

The change-gear ratio R is checked against the range between the minimum change-gear ratio (Low) or the maximum change-gear ratio (Top) because data tables for storing upper and lower limits of the target rotational speed of the engine shown in FIGS. 6 and 7, respectively, are created including limit values corresponding to the change-gear ratios R beyond the range which are shown in the Figures as characteristics represented by dotted lines. The limit values corresponding to the change-gear ratios R beyond the range are included in the data tables in order to simplify the process of creating the tables. If data tables for storing upper and lower limits of the target rotational speed of the engine are created within the range between the minimum change-gear ratio (Low) or the maximum change-gear ratio (Top) from the beginning, it will become unnecessary for the change-gear ratio controlling means 20 to check the change-gear ratio R against the range and for the change-gear ratio detecting means 13 to supply the change-gear ratio monitored thereby to the change-gear ratio controlling means 20.

Figure 12:
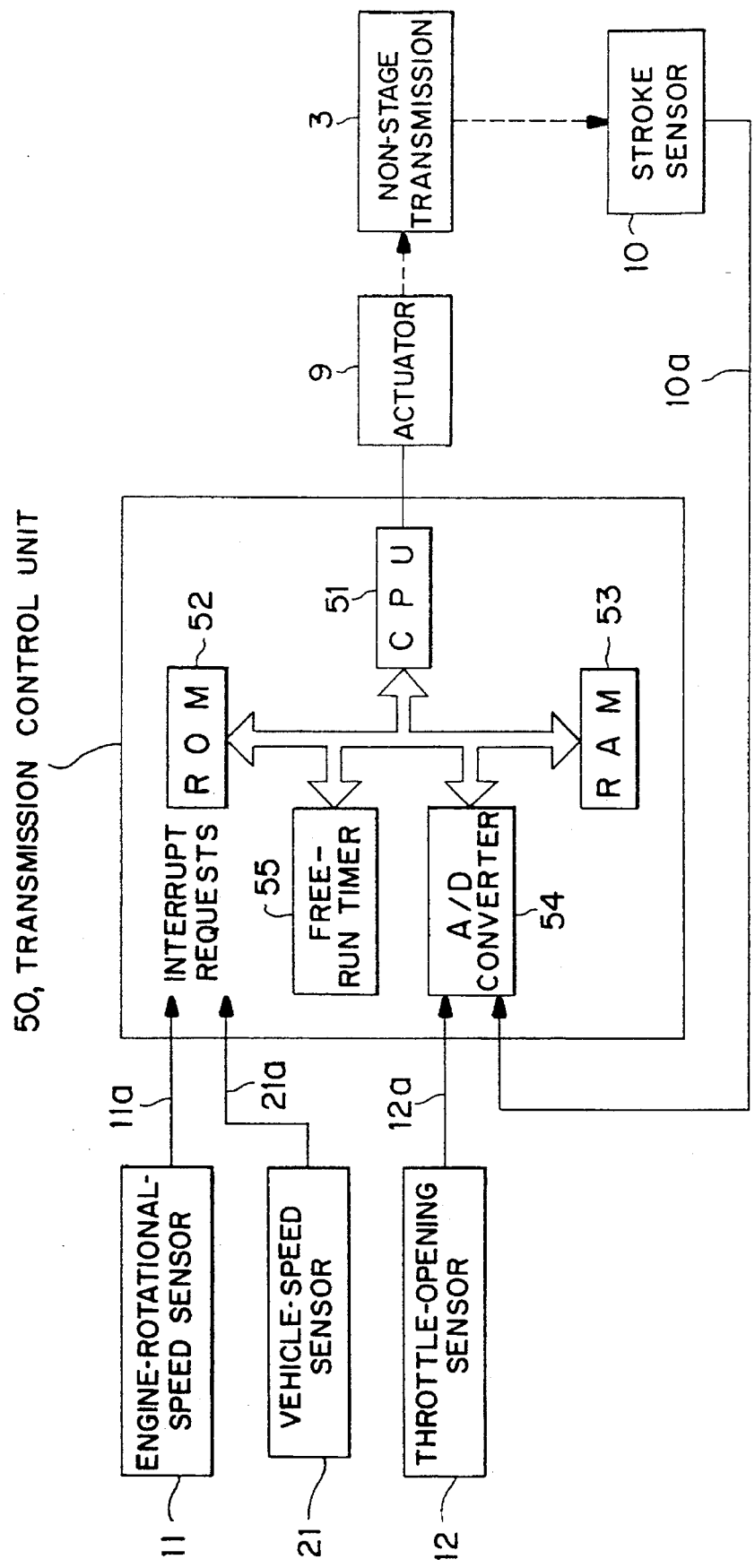
FIG. 12 shows a block diagram of the configuration of a microcomputer system serving as a transmission control unit.

A block diagram of the configuration of a microcomputer system serving as a transmission control unit 50 is shown in FIG. 12.

As shown in FIG. 12, the microcomputer system which serves as the transmission control unit 50 comprises a CPU 51, a ROM unit 52, a RAM unit 53, an A/D converter 54 and a free-run timer 55.

The ROM unit 52 is used for storing a transmission-control program written in advance as well as the fuzzy rules shown in FIG. 3, the membership functions shown in FIG. 4, the target engine rotational speed upper limit data table shown in FIG. 6, the target engine rotational speed lower limit data table shown in FIG. 7 and the target engine rotational speed change rate data table shown in FIG. 10.

The detection signal 21a, a train of pulses output by the vehicle-speed sensor 21, and the detection signal 11a, a train of pulses output by the engine rotational speed sensor 11, are supplied to the CPU 51 as interrupts. In response to the interrupts, the CPU 51 carries out interrupt processing. In this way, the speed of the vehicle and the rotational speed of the engine that requires prompt processing can be detected.

The voltage signal 10a from the stroke sensor 10 representing the change-gear ratio R and the voltage signal 12a from the throttle-opening sensor 12 representing the throttle opening Θ are each converted by the A/D converter 54 into a digital signal which is supplied to the CPU 51. Strictly speaking, the CPU 51 activates the A/D converter 54 when the CPU 51 requires the values of the change-gear ratio R and the throttle opening Θ and then reads in the digital data therefrom.

Figure 13:
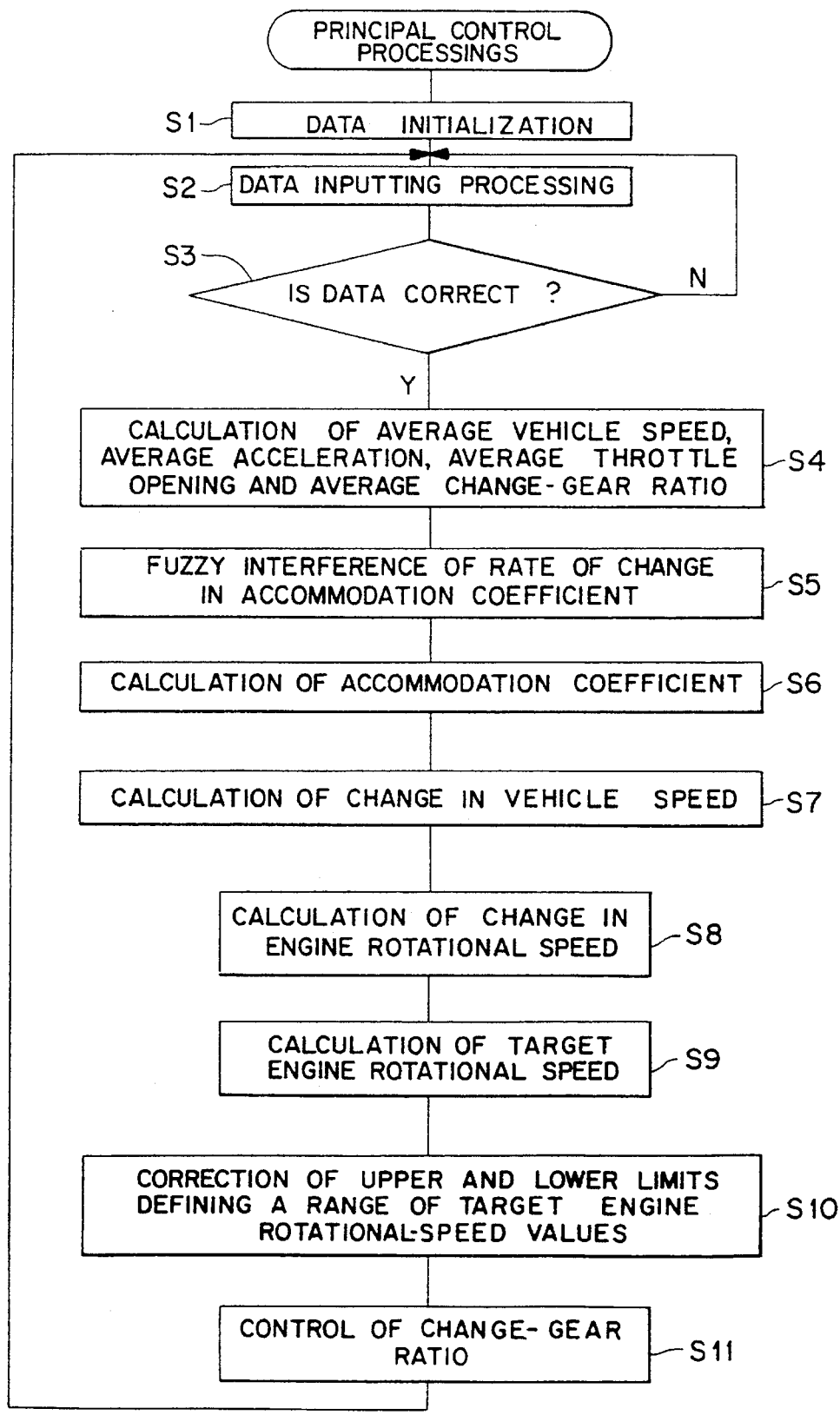
FIG. 13 is a flowchart showing principal processing carried out by the transmission control unit.

A flowchart showing principal processing carried out by the transmission control unit 50 is shown in FIG. 13.

When power is supplied to the transmission control unit 50, the CPU 51 receives an initialization signal which is typically generated by the operation of a power-on initialization circuit not shown in any of the Figures. Receiving the initialization signal at a step S1, the CPU 51 initializes a variety of kinds of data stored in the RAM unit 53. At the same time, the CPU 51 is put in an interrupt-enabled state.

Interrupted by the detection signals 11a and 21a, trains of pulses generated by the engine rotational speed sensor 11 and the vehicle-speed sensor 21 as described earlier, at a step S2, the CPU 51 carries out interrupt processing to compute the rotational speed N of the engine, the speed V of the vehicle and the change in vehicle speed per unit time (or the acceleration) G and, at the same time, processing to input the throttle opening Θ and the change-gear ratio R through the A/D converter 54. The data acquiring processing carried out at step S2 is repeated until a plurality of sets of data are collected. The sets of data each comprise the speed V of the vehicle, the change in vehicle speed per unit time (or the acceleration) G, the throttle opening Θ and the change-gear ratio R. Typically, ten sets of such data are collected.

At a step S3, it is verified as to whether or not the required sets of such data have been collected. If the required sets of data are found at the step S3 to have been collected, the flow continues to a step S4 to find average values of the sets of data: an average engine rotational speed Na, an average speed Va of the vehicle, an average change in vehicle speed (or an average acceleration) Ga, an average throttle opening ea and an average change-gear ratio Ra.

It should be noted that the detection signal 12a output by the throttle-opening sensor 12 can be supplied to the A/D converter 54 through a time-constant circuit, typically a low-pass filter circuit, having a predetermined time constant. In such a case, instead of acquiring a plurality of pieces of throttle-opening data and computing an average value for them, the A/D converter is activated only when it is necessary to read throttle-opening data. This technique is also applicable to the processing to read in data of the change-gear ratio R.

At a step S5, fuzzy-inference based processing of the rate of change $\Delta A$ in accommodation coefficient A is performed. This fuzzy-inference based processing is a process to compute membership values of the input values (or the average-value data) acquired in the step S4 which are found for each of the fuzzy sets: the speed of the vehicle, the change-gear ratio, the throttle opening and the change in vehicle speed per unit time (or the acceleration) shown in FIGS. 4(a) to (d). The membership values are used in conjunction with the fuzzy rules shown in FIG. 3 and the consequent conditions (or the fuzzy sets of the rate of change $\Delta A$ in accommodation coefficient A shown in FIG. 4(e) as described earlier) for determining a membership function of the rate of change $\Delta A$ in accommodation coefficient A for each of the fuzzy rules. Then, from the membership functions of the rate of change $\Delta A$ in accommodation coefficient A determined for the individual fuzzy rules, a synthetic rate of change ΔA is inferred by means of the Min-Max method of elastic center.

At a step S6, a most recent value of the accommodation coefficient A is found from the synthetic rate of change ΔA inferred in the step S5.

In this embodiment, the rate of change ΔA in accommodation coefficient A is found as a rate of change expressed in terms of percents. The rate of change is thus found by measuring a period between points of time at which immediately previous and current values of the rate of change ΔA in accommodation coefficient A are output. The period between the two points of time is multiplied by the current value of the rate of change ΔA in the accommodation coefficient A to give a change in the accommodation coefficient A which is added to or subtracted from the value of the accommodation coefficient A computed previously to result in a most recent value of the accommodation coefficient A. It should be noted that the initial value of the accommodation coefficient A is set at 0% when negative values of the accommodation coefficient A found by calculation are rounded up to the minimum 0%. On the other hand, the values of the accommodation coefficient A found by calculation to be greater than 100% are rounded down to the maximum 100%.

At a step S7, the change in vehicle speed ΔV is found as a difference between the current average speed Va of the vehicle and the previous average speed Va of the vehicle. It should be noted that, initially, zero is used as the previous average speed Va of the vehicle.

At a step S8, the target engine rotational speed change rate data table shown in FIG. 10 is searched for a value of the target engine rotational speed change rate for the average speed Va of the vehicle. The value of the target engine rotational speed change rate for the average speed Va of the vehicle is then multiplied by the change in vehicle speed ΔV found at the step S7 to provide a change in target engine rotational speed ΔN. Refer to FIG. 11.

At a step S9, the change in target engine rotational speed ΔN is added to or subtracted from a target engine rotational speed NE found previously to give a new target engine rotational speed NE. Even though an idle rotational speed can be typically used as an initial value of the target engine rotational speed NE, in the case of the embodiment, a target engine rotational-speed lower limit NL for a vehicle speed of zero and an accommodation coefficient A found in the step S6 is used as the initial value.

At a step S10, a value the target engine rotational speed NE found in the step S9 is corrected so as not to go beyond a predetermined range.

First of all, the average speed Va of the vehicle and the average throttle opening Θa found at the step S4 as well as the accommodation coefficient A found at the step S6 are utilized for searching the target engine rotational speed upper limit data table shown in FIG. 6 for data to be used in the eight-point interpolation technique shown in FIG. 8 which provides an upper-limit value NU of the target engine rotational speed NE. Next, the average speed Va of the vehicle at the step S4 and the accommodation coefficient A found at the step S6 are utilized for searching the target engine rotational speed lower limit data table shown in FIG. 7 for data to be used in the four-point interpolation technique shown in FIG. 9 which provides a lower-limit value NL of the target engine rotational speed NE. If the new target engine rotational speed NE found at a step S9 is within a range between the upper limit value NU and the lower limit value NL, the new target engine rotational speed NE is considered to be valid. If the new target engine rotational speed NE is greater than the upper-limit value NU, however, the upper-limit value NU is then output as a new target engine rotational speed NE. If the new target engine rotational speed NE is smaller than the lower-limit value NL, on the other hand, the lower-limit value NL is then output as a new target engine rotational speed NE.

At a step S11, the target engine rotational speed NE found at the step S10 is compared to the average engine rotational speed Na found at the step 4 and a transmission signal 5a is issued to eliminate the difference between the target engine rotational speed NE and the average engine rotational speed Na. It should be noted that, when the change-gear ratio R goes beyond a range between the minimum change-gear ratio (Low) and the maximum change-gear ratio (Top) of the nonstage transmission 3, a speed-change command 5a for providing the minimum change-gear ratio (Low) or the maximum change-gear ratio (Top) is issued instead.

As an alternative, while the processing at the steps S4 to S11 are being carried out, interrupts can be disabled so that the processing to compute the rotational speed N of the engine, the speed V of the vehicle and the change in vehicle speed per unit time (or the acceleration) G are not performed. After transmission control based on a new accommodation coefficient A has been carried out, the interrupts are again enabled to acquire as many pieces of data as required.

Figure 14:
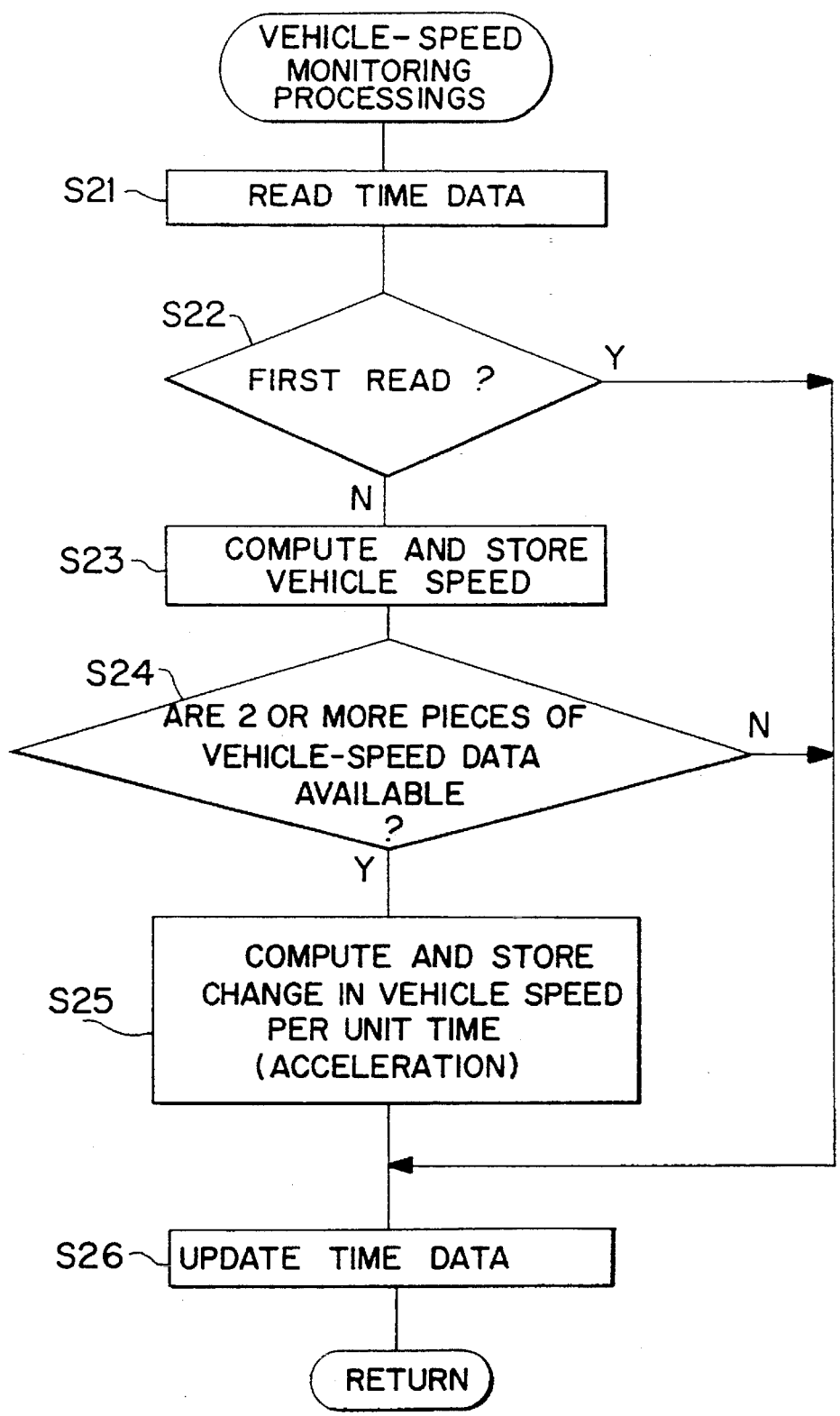
FIG. 14 is a flowchart showing operations in the processing to monitor the speed of the vehicle.

A flowchart showing operations in the processing to monitor the speed V of the vehicle is shown in FIG. 14.

The vehicle-speed detection processing shown as the flowchart of FIG. 14 is invoked by suspending the main control processing shown in FIG. 13 each time the vehicle-speed sensor 21 outputs a pulse of the detection signal 21a.

A pulse of the detection signal 21a generated by the vehicle-speed sensor 21 makes a request for an interrupt to detect the value of the speed V of the vehicle. The interrupt, in turn, invokes the vehicle-speed detection processing wherein time data contained in free-run timer 55 is read in at a step S21.

It is necessary to measure a time gap between two consecutive pulses of the detection signal 21a in order to compute the speed V of the vehicle. Thus, when the first time data is read in at a step S21, the flow goes to a step S26 through a step S22 in which case the time data is merely stored for later processing. When the second or subsequent time data is read in, a difference between the time data just read in and that read in previously is computed at a step S23. The speed V of the vehicle is then computed by typically dividing a constant proportional to the diameter of the tire by the time gap or the difference between the two pieces of time data. The speed V of the vehicle is then stored in a vehicle-speed storage area in the RAM unit 53. Typically, ten such vehicle-speed storage areas are prepared. Values of the speed V of the vehicle each computed in a processing loop are stored one after another in the vehicle-speed storage areas in a predetermined order.

Two consecutive values of the speed V of the vehicle and the computed time gap between the two vehicle speeds are required for calculating the change in vehicle speed per unit time (or the acceleration) G. When two or more pieces of vehicle-speed data are found to exist at the step S24, the flow continues to a step S25 to calculate the change in vehicle speed per unit time (or the acceleration) G. The change in vehicle speed per unit time (or the acceleration) G is computed by dividing a difference between the current vehicle speed and the immediately previous vehicle speed stored in a vehicle-speed area in the RAM unit 53 by a difference between the current measurement time and the immediately previous measurement time. The change in vehicle speed per unit time (or the acceleration) G computed in this way is stored in an acceleration storage area in the RAM unit 53. Typically, there are ten such acceleration storage areas in the RAM unit 53. At the step S25, values of the acceleration G each computed in a processing loop are stored one after another in the acceleration storage areas in a predetermined order.

Figure 15:
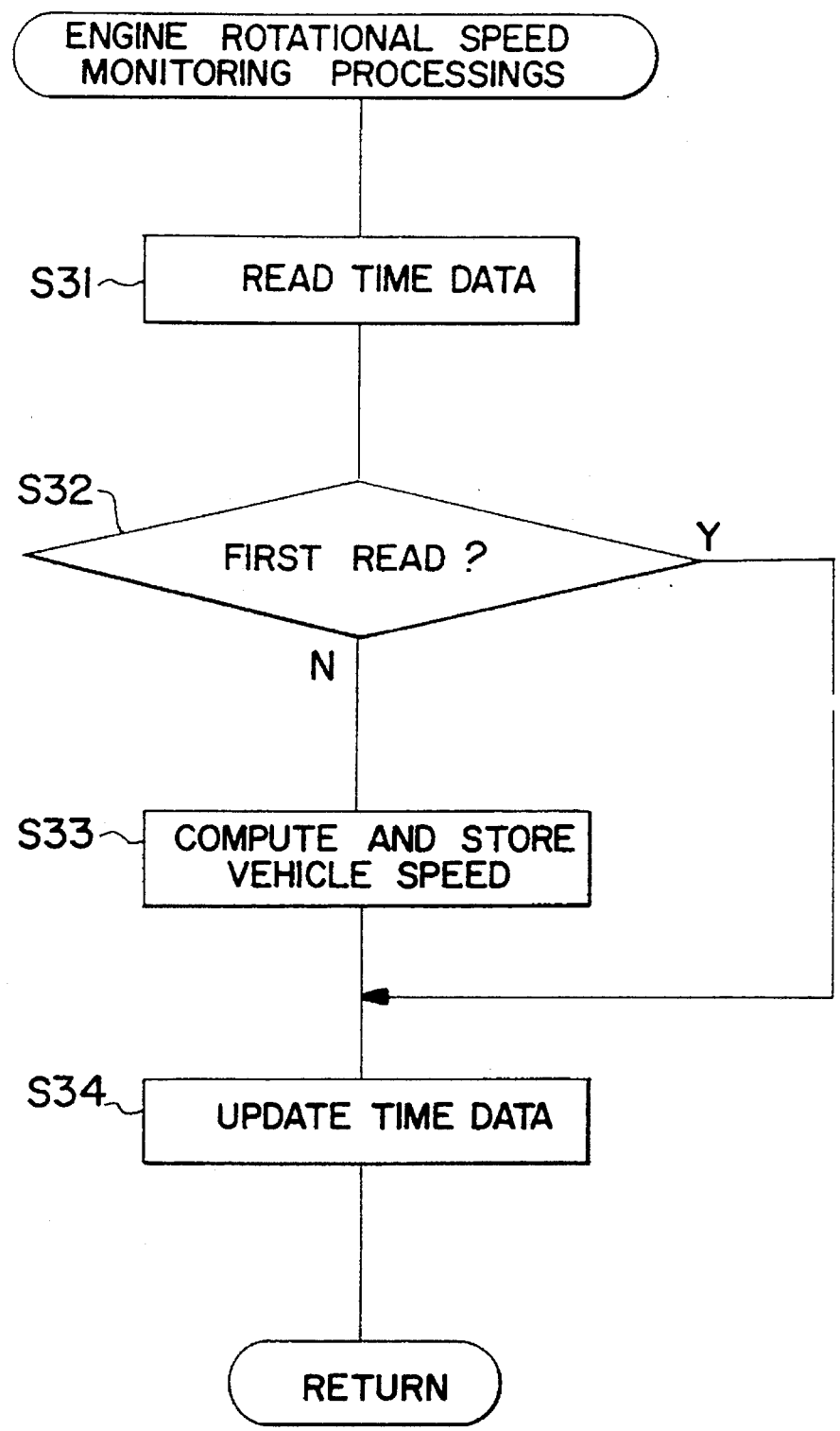
FIG. 15 is a flowchart showing operations in the processing to monitor the rotational speed of the engine.

A flowchart showing operations in the processing to monitor the rotational speed N of the engine is shown in FIG. 15.

Each time a pulse of the detection signal 11a generated by the engine-rotational-speed sensor 11 is input, interrupt processing for detecting the rotational speed N of the engine is invoked.

When a pulse of the detection signal 11a is input, the contents of the free-run timer 55 are read in at a step S31, a step at the beginning of the interrupt processing.

It is necessary to measure the time gap between two consecutive pulses of the detection signal 11a in order to compute the rotational speed N of the engine. Thus, when the first time data is read in at a step S31, the flow goes to a step S34 through a step S32 in which case the time data is merely stored for later processing. When the second or subsequent time data is read in, a difference between the time data just read in and that read in previously is computed at a step S33. The rotational speed N of the engine is then computed by typically dividing a constant by the time gap or the difference between the two pieces of time data. The rotational speed N of the engine is then stored in a storage area for the rotational speed N of the engine in the RAM unit 53. Typically, ten such storage areas are prepared. Values of the speed V of the vehicle each computed in a processing loop are stored one after another in the storage areas in a predetermined order at the step S33.

By subsequently repeating the processing at the steps S2 to S11 shown in FIG. 13, the accommodation coefficient A indicating the running state is updated for each of the processing to keep up with changes in running conditions such as the speed V of the vehicle, the change in vehicle speed per unit time (or the acceleration) G and the throttle opening Θ. The change-gear ratio R of the nonstage transmission 3 is controlled in such a way that the value of the target engine rotational speed falls within a range set on the basis of the most recent accommodation coefficient A. Accordingly, a value of the rotational speed NE of the engine adapted to the running state can be obtained. As a result, the driver is provided with a driving feeling that faithfully keeps up with various running states of the vehicle and running requirements of the driver.

This embodiment has a configuration comprising the steps of:

calculating the accommodation coefficient after finding the rate of change in accommodation coefficient by fuzzy inference;

setting upper and lower limits of a range for the target engine rotational speed on the basis of the accommodation coefficient calculated at the above step; and controlling the change-gear ratio R of the nonstage transmission so as to provide an actual rotational speed of the engine in the range.

It should be noted, however, that the accommodation coefficient A can also be inferred directly from input data related to running states such as the speed V of the vehicle, the change in vehicle speed per unit time (or the acceleration) G, the throttle opening Θ and the change-gear ratio R by fuzzy inference.

By the same token, an embodiment can also be configured wherein:

a target engine rotational-speed data table is provided for directly specifying the target engine rotational speed NE from input data comprising the speed V of the vehicle, the throttle opening Θ and the accommodation coefficient A;

the target engine rotational speed NE is directly set on the basis of a value of the accommodation coefficient A found by fuzzy inference; and the change-gear ratio R of the nonstage transmission is controlled to result in the target engine rotational speed NE directly set as described above.

As described above, the transmission control apparatus for a nonstage transmission of a vehicle provided by the present invention executes the steps of:

finding an accommodation coefficient indicating the running state of the vehicle from inputs comprising demanded engine-output quantities such as the throttle opening, the speed of the vehicle, the change-gear ratio and the rate of change in vehicle speed or the acceleration on the basis of fuzzy rules set in advance; and setting a target rotational speed of the engine or a range of rotational-speed values of the engine in accordance with the speed of the vehicle and the accommodation coefficient found at the previous step. Accordingly, values of the accommodation coefficient faithfully keeping up with the various running states of the vehicle and the running requirements of the driver can be obtained and transmission control can then be executed to result in target rotational speeds of the engine set on the basis of these accommodation coefficient values. As a result, the driver is provided with a driving feeling which faithfully keeps up with various running states of the vehicle and running requirements of the driver.

It should be noted that a rate of change in accommodation coefficient is found by fuzzy inference and the rate of change is used for increasing or decreasing the accommodation coefficient. Accordingly, an abrupt change in accommodation coefficient can be eliminated. As a result, a vehicle that is easy to drive can be provided.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission control apparatus for a nonstage transmission of a vehicle comprising:

a target engine rotational speed setting means for setting a target rotational speed of an engine in accordance with at least the speed of said vehicle and an accommodation coefficient indicating a running state of said vehicle;

an accommodation coefficient fuzzy-inferring means for inferring said accommodation coefficient from inputs including demanded engine output quantities, the speed of said vehicle, a change-gear ratio and a rate of change in vehicle speed on the basis of fuzzy rules; and a change-gear ratio controlling means for controlling a change-gear ratio of said nonstage transmission on the basis of said accommodation coefficient derived by said accommodation coefficient fuzzy-inferring means to cause said engine to rotate at said target rotational speed.

2. The transmission control apparatus according to claim 1, wherein said change-gear ratio controlling means includes a pulley position and change-gear ratio data table for determining the relationship between the position of the driving pulley and the change-gear ratio.

3. The transmission control apparatus according to claim 2, wherein a change-gear ratio detecting means outputs digital information corresponding to the change-gear ratio of the nonstage transmission.

4. The transmission control apparatus according to claim 1, wherein a change-gear ratio detecting means receives an input of a rotational speed on an input side and an output side of the nonstage transmission for determining the change-gear ratio.

5. The transmission control apparatus according to claim 1, wherein said target engine rotational speed setting means receives as inputs a throttle opening, an accommodation coefficient, a change in vehicle speed and the vehicle speed for deriving the target rotational speed.

6. A transmission control apparatus for a nonstage transmission of a vehicle comprising:

a target engine rotational speed setting means for setting a rotational speed range of said engine in accordance with at least the speed of said vehicle and an accommodation coefficient indicating a running state of said vehicle;

an accommodation coefficient fuzzy-inferring means for inferring said accommodation coefficient from inputs including demanded engine output quantities, the speed of said vehicle, a change-gear ratio and an acceleration on the basis of fuzzy rules set in advance; and a change-gear ratio controlling means for controlling a change-gear ratio of said nonstage transmission on the basis of said accommodation coefficient derived by said accommodation coefficient fuzzy-inferring means to cause said engine to rotate at a speed within said rotational speed range of said engine set by said target engine rotational speed setting means.

7. The transmission control apparatus according to claim 6, wherein said change-gear ratio controlling means includes a pulley position and change-gear ratio data table for determining the relationship between the position of the driving pulley and the change-gear ratio.

8. The transmission control apparatus according to claim 7, wherein a change-gear ratio detecting means outputs digital information corresponding to the change-gear ratio of the nonstage transmission.

9. The transmission control apparatus according to claim 6, wherein a change-gear ratio detecting means receives an input of a rotational speed on an input side and an output side of the nonstage transmission for determining the change-gear ratio.

10. The transmission control apparatus according to claim 6, wherein said target engine rotational speed setting means receives as inputs a throttle opening, an accommodation coefficient, a change in vehicle speed and the vehicle speed for deriving the target rotational speed.

11. A transmission control apparatus for a nonstage transmission of a vehicle comprising:

a target engine rotational speed setting means for setting a target rotational speed of an engine in accordance with at least an accommodation coefficient indicating a running state of said vehicle;

an accommodation coefficient fuzzy-inferring means for inferring a rate of change in accommodation coefficient and then deriving said accommodation coefficient from said inferred rate of change; and a change-gear ratio controlling means for controlling a change-gear ratio of said nonstage transmission on the basis of said accommodation coefficient derived by said accommodation coefficient fuzzy-inferring means to cause said engine to rotate at said target rotational speed.

12. The transmission control apparatus according to claim 11, wherein said change-gear ratio controlling means includes a pulley position and change-gear ratio data table for determining the relationship between the position of the driving pulley and the change-gear ratio.

13. The transmission control apparatus according to claim 12, wherein a change-gear ratio detecting means outputs digital information corresponding to the change gear ratio of the nonstage transmission.

14. The transmission control apparatus according to claim 11, wherein a change-gear ratio detecting means receives an input of a rotational speed on an input side and an output side of the nonstage transmission for determining the change-gear ratio.

15. The transmission control apparatus according to claim 11, wherein said target engine rotational speed setting means receives as inputs a throttle opening, an accommodation coefficient, a change in vehicle speed and the vehicle speed for deriving the target rotational speed.

16. A transmission control apparatus for a nonstage transmission of a vehicle comprising:

a target engine rotational speed setting means for setting a rotational speed range of said engine in accordance with at least the speed of said vehicle and an accommodation coefficient indicating a running state of said vehicle;

an accommodation coefficient fuzzy-inferring means for inferring said accommodation coefficient from inputs including demanded engine output quantities, the speed of said vehicle, a change-gear ratio and a rate of change in vehicle speed, or alternatively, for deriving said accommodation coefficient on the basis of an inferred rate of change in said accommodation coefficient which is inferred from a change in said accommodation coefficient; and a change-gear ratio controlling means for controlling a change-gear ratio of said nonstage transmission on the basis of said accommodation coefficient derived by said accommodation coefficient fuzzy-inferring means to cause said engine to rotate at a speed within said rotational speed range of said engine set by said target engine rotational speed setting means.

17. The transmission control apparatus according to claim 16, wherein said change-gear ratio controlling means includes a pulley position and change-gear ratio data table for determining the relationship between the position of the driving pulley and the change-gear ratio.

18. The transmission control apparatus according to claim 17, wherein a change-gear ratio detecting means outputs digital information corresponding to the change-gear ratio of the nonstage transmission.

19. The transmission control apparatus according to claim 16, wherein a change-gear ratio detecting means receives an input of a rotational speed on an input side and an output side of the nonstage transmission for determining the change-gear ratio.

20. The transmission control apparatus according to claim 16, wherein said target engine rotational speed setting means receives as inputs a throttle opening, an accommodation coefficient, a change in vehicle speed and the vehicle speed for deriving the target rotational speed.

21. A transmission control method for a nonstage transmission of a vehicle comprising the following steps:

- inferring an accommodation coefficient from inputs including demanded engine-output quantities, the speed of the vehicle, a change-gear ratio and a rate of change in vehicle speed on the basis of fuzzy rules set in advance;
- setting a target rotational speed of the engine in accordance with at least the speed of the vehicle and the accommodation coefficient inferred in the previous step; and
- controlling the change-gear ratio of the nonstage transmission to cause said engine to rotate at a speed within the target rotational speed of the engine set at the immediately previous step.

22. A transmission control method for a nonstage transmission of a vehicle comprising the following steps:

- inferring an accommodation coefficient from inputs including demanded engine-output quantities, the speed of the vehicle, a change-gear ratio and a rate of change in vehicle speed by inferring the rate of change in the accommodation coefficient and then deriving an accommodation coefficient from the inferred rate of change;
- setting a target rotational speed of the engine in accordance with at least the speed of the vehicle and the accommodation coefficient derived in the previous step; and
- controlling the change-gear ratio of the nonstage transmission to cause said engine to rotate at a speed within the target rotational speed of the engine set at the immediately previous step.

23. A transmission control method for a nonstage transmission of a vehicle comprising the following steps:

- inferring an accommodation coefficient from inputs including demanded engine-output quantities, the speed of the vehicle, a change-gear ratio and a rate of change in vehicle speed on the basis of fuzzy rules set in advance;
- setting a range of rotational-speed values of the engine in accordance with at least the speed of the vehicle and the accommodation coefficient inferred in the previous step; and
- controlling the change-gear ratio of the nonstage transmission to cause said engine to rotate at a speed within the range of rotational-speed values of the engine set at the immediately previous step.

24. A transmission control method for a nonstage transmission of a vehicle comprising the following steps:

- inferring an accommodation coefficient from inputs including demanded engine-output quantities, the speed of the vehicle, a change-gear ratio and a rate of change in vehicle speed by inferring the rate of change in the accommodation coefficient and then deriving an accommodation coefficient from the inferred rate of change;
- setting a range of rotational-speed values of the engine in accordance with at least the speed of the vehicle and the accommodation coefficient derived in the previous step; and
- controlling the change-gear ratio of the nonstage transmission to cause said engine to rotate at a speed within the range of rotational-speed values of the engine set at the immediately previous step.

* * * * *